United States Patent [19]

Taniyama et al.

[11] 4,196,014
[45] Apr. 1, 1980

[54] SURFACE-TREATING PAINT FOR SHAPED PLASTIC ARTICLES

[75] Inventors: Susumu Taniyama, Toyonaka; Hiromitsu Takanohashi, Takarazuka; Shoichi Inoue, Itami, all of Japan

[73] Assignee: Mitsubishi Gas Chemical Company, Inc., Japan

[21] Appl. No.: 917,025

[22] Filed: Jun. 19, 1978

[30] Foreign Application Priority Data

Jun. 22, 1977 [JP] Japan .................................. 52-74109

[51] Int. Cl.² ................................................ C09K 3/00
[52] U.S. Cl. ........................... 106/287.13; 260/448 A; 528/29
[58] Field of Search ...................... 106/287.12, 287.13; 260/448.8 A; 528/29

[56] References Cited

U.S. PATENT DOCUMENTS

| | | | |
|---|---|---|---|
| 2,928,857 | 3/1960 | Holt et al. | 252/78.3 |
| 3,223,642 | 12/1965 | Smith et al. | 252/78.3 |
| 3,246,030 | 4/1966 | Seil et al. | 260/448.8 A |
| 3,463,802 | 8/1969 | Blake et al. | 260/448.8 A |
| 3,491,134 | 1/1970 | Seil et al. | 260/448.8 A |
| 3,961,977 | 6/1976 | Koda et al. | 106/287.12 |

*Primary Examiner*—Theodore Morris
*Attorney, Agent, or Firm*—Wenderoth, Lind & Ponack

[57] ABSTRACT

A surface-treating paint for shaped plastic articles, said paint being the reaction product of (1) 50 to 95 mole % of an epoxyalkylalkoxysilane of the general formula

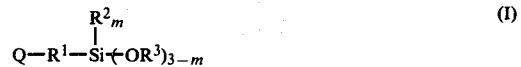

$$Q-R^1-Si(OR^3)_{3-m}(R^2)_m \quad (I)$$

wherein $R^1$ represents a divalent hydrocarbon group having 1 to 4 carbon atoms, $R^2$ and $R^3$ represent a monovalent hydrocarbon group having 1 to 4 carbon atoms, Q represents a glycidoxy or epoxycyclohexyl group, and m is 0 or 1, and (2) 50 to 5 mole % of a fluorinated alcohol of the general formula

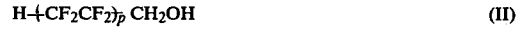

$$H(CF_2CF_2)_p CH_2OH \quad (II)$$

wherein p is an integer of 1 to 7.

The paint may further contain 50 to 5% by weight of the reaction product of (a) 80 to 30 mole % of an epoxyalkylalkoxysilane of general formula (I) with (b) 20 to 70 mole % of an aminoalkylalkoxysilane of the general formula

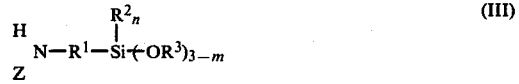

$$\begin{matrix} H \\ \phantom{H}\diagdown \\ \phantom{HH}N-R^1-Si(OR^3)_{3-m}(R^2)_n \\ Z \end{matrix} \quad (III)$$

wherein $R^1$, $R^2$ and $R^3$ are as defined with regard to general formula (I), Z represents a hydrogen atom or an aminoalkyl group, and n is 0 or 1, or a partially hydrolyzed product of the reaction product.

6 Claims, No Drawings

SURFACE-TREATING PAINT FOR SHAPED PLASTIC ARTICLES

This invention relates to a surface-treating paint for shaped plastic articles which imparts scratch resistance and permanent antistatic properties thereto.

Shaped articles of transparent plastics such as polycarbonate, polymethyl methacrylate, polyvinyl chloride, cellulose butyrate and polystyrene have many promising applications as a glass substitute because of their transparency and light weight, but since they are susceptible to scratch and tend to lose transparency, they have had only limited commercial applications.

In an attempt to remove such a defect, a method was suggested which involves coating the surface of a shaped plastic article with a clear paint to form a protective coating. Coatings prepared from conventional paints are unsatisfactory for one or more reasons. For example, they have insufficient resistance to scratch. Or even when they have sufficient scratch resistance, they often lack adhesion to substrate resins or durability in outdoor use.

For example, U.S. Pat. No. 3,451,838 discloses a method which comprises coating the surface of an acrylic resin or polycarbonate resin with a paint consisting of a mixture of methyltriethoxysilane and phenyltriethoxysilane and curing the coating. However, the surface-coated plastic article obtained by this method has inferior scratch resistance, and has only limited applications.

Japanese Laid-Open Patent Publication No. 84878/73 discloses a method which comprises coating a paint composed of a partially hydrolyzed product of an epoxyalkylalkoxysilane and an aminoalkylalkoxysilane and an organic solvent on a plastic article and curing the coating. The surface-coated plastic article obtained by this method has superior scratch resistance, but has the defect that its resistance to hydrolysis and light is low, and in outdoor use, the coating develops cracks within short periods of time or at times, undergoes peeling.

Japanese Patent Publication No. 32423/73 discloses a paint consisting mainly of a copolymer of tetrafluoroethylene and 4-hydroxybutylvinyl ether. This paint has superior scratch resistance and adhesion, but suffers from the defect that since it has no ability to prevent static buildup, dirt and dust readily adhere to its surface to impair its appearance and transparency.

In order to remove the defects of the prior art methods, the present inventors made extensive investigations, and finally found a paint which gives a coating having superior scratch resistance, adhesion, durability and antistatic properties.

According to one aspect of this invention, there is provided a surface-treating paint (to be referred to as paint A) for shaped plastic articles, and paint being the reaction product of 50 to 95 mole% of an epoxyalkylalkoxysilane expressed by the formula $$Q-R^1-Si(OR^3)_{3-m}\quad R^2_m \tag{I}$$

wherein $R^1$ represents a divalent hydrocarbon group having 1 to 4 carbon atoms, $R^2$ and $R^3$ represent a monovalent hydrocarbon group having 1 to 4 carbon atoms, Q represents a glycidoxy or epoxycyclohexyl group, and m is 0 or 1, with 50 to 5 mole% of a fluorinated alcohol of the general formula $$H-(CF_2CF_2)_p-CH_2OH \tag{II}$$

wherein p is an integer of 1 to 7.

According to another aspect of this invention, there is provided a surface-treating paint (to be referred to as paint A*) for shaped plastic articles, said paint being a mixture of 50 to 95% by weight of paint A, and 50 to 5% by weight of the reaction product of 80 to 30 mole% of an epoxyalkylalkoxysilane of general formula (I) above with 20 to 70 mole% of an aminoalkylalkoxysilane of the general formula

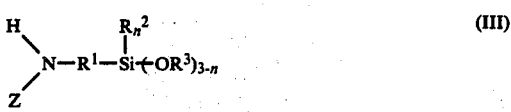

wherein $R^1$, $R^2$ and $R^3$ are as defined above with respect to general formula (I), Z represents a hydrogen atom or an aminoalkyl group, and n is 0 or 1, or a partially hydrolyzed product of the reaction product (to be referred to as paint B).

Examples of the epoxyalkylalkoxysilane of general formula (I) used in this invention include γ-glycidoxypropyltrimethoxysilane $$CH_2\underset{O}{\underset{\diagdown\diagup}{-}}CH-CH_2OCH_2CH_2CH_2-Si(OCH_3)_3$$

β-(3,4-epoxycyclohexyl)ethyltrimethoxysilane

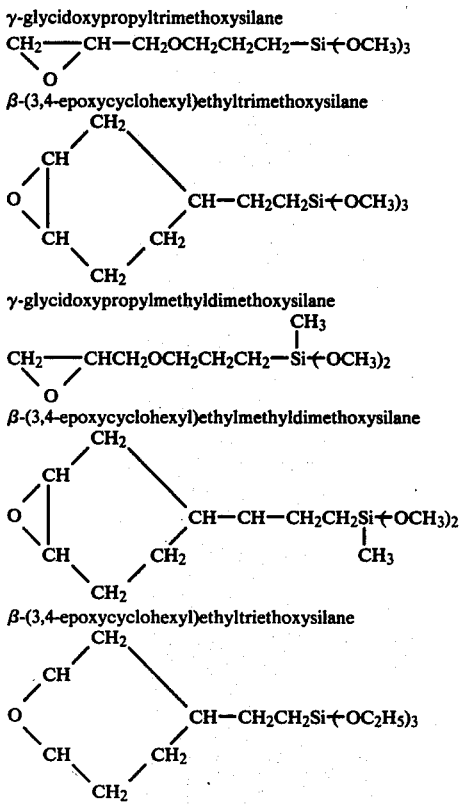

γ-glycidoxypropylmethyldimethoxysilane $$CH_2\underset{O}{\underset{\diagdown\diagup}{-}}CHCH_2OCH_2CH_2CH_2-\underset{\underset{CH_3}{|}}{Si}(OCH_3)_2$$

β-(3,4-epoxycyclohexyl)ethylmethyldimethoxysilane

β-(3,4-epoxycyclohexyl)ethyltriethoxysilane

Examples of the fluorinated alcohol of general formula (II) include
2,2,3,3-tetrafluoropropanol
  $HCF_2CF_2CH_2OH$
2,2,3,3,4,4,5,5-octafluoropentanol
  $HCF_2CF_2CF_2CF_2CH_2OH$
2,2,3,3,4,4,5,5,6,6,7,7-dodecafluoroheptanol
  $HCF_2CF_2CF_2CF_2CF_2CF_2CH_2OH$.

Examples of the aminoalkylalkoxysilane of general formula (III) are as follows:

aminomethyltriethoxysilane
$NH_2CH_2Si(OC_2H_5)_3$

N-β-aminoethylaminomethyltrimethoxysilane
$NH_2CH_2CH_2NHCH_2Si(OCH_3)_3$

γ-aminopropyltriethoxysilane
$NH_2CH_2CH_2CH_2SI(OC_2H_5)_3$

N-(trimethoxysilylpropyl)-ethylenediamine
$NH_2CH_2CH_2NHCH_2CH_2CH_2Si(OCH_3)_3$ N-(dimethoxymethylsilylpropyl)-ethylenediamine

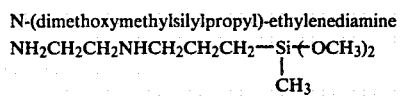

The paint A of this invention is obtained by reacting 50 to 95 mole% of the epoxyalkylalkoxysilane (I) with 50 to 5 mole% of the fluorinated alcohol (II). The reaction is usually carried out at a temperature of 60° to 120° C., preferably 70° to 100° C., for a period of 5 to 20 hours, preferably 10 to 15 hours. Preferably, it is carried out in the presence of 0.1 to 5 parts by weight of an ordinary acid base catalyst. Examples of the ordinary acid base catalyst include $H_2SO_4$, $H_3PO_4$, NaOH, dimethylbenzylamine, dimethylaniline, trimethylbenzyl ammonium salt, triethylamine, and alcoholates.

It is presumed that the reaction of the compounds (I) and (II) proceeds mainly through the reaction of epoxy groups and hydroxyl groups. For example, when the compound (I) is a glycidoxyalkylalkoxysilane, paint A is believed to be obtained in accordance with the following scheme.

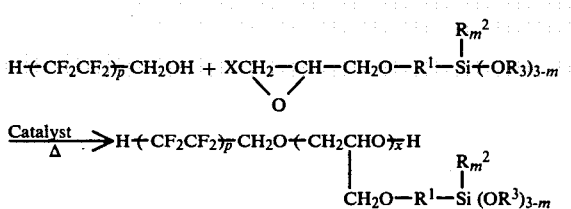

The paint A* of this invention is prepared by mixing 50 to 90% by weight of paint A with 50 to 5% by weight of paint B. This paint A* has better adhesion to base resins.

The paint B is prepared by reacting 80 to 30 mole%, preferably 70 to 40 mole%, of the epoxyalkylalkoxysilane of formula (I) with 20 to 70 mole%, preferably 30 to 60 mole%, of the aminoalkylalkoxysilane (III) at a temperature of usually 60° to 150° C., preferably 80° to 120° C., for period of 0.3 to 3 hours, preferably 1 to 2 hours. Or the paint B is a partially hydrolyzed product obtained by hydrolyzing not more than 40 mole% of all alkoxy groups of the above reaction product. A preferred method of obtaining such a partially hydrolyzed product comprises hydrolyzing the reaction product between the epoxyalkylalkoxysilane and the aminoalkylalkoxysilane in the presence of an organic solvent using water in an amount corresponding to 10 to 40 mole% of the amount of water required to hydrolyze all alkoxy groups, at a temperature of usually 10° to 100° C., preferably 20° to 50° C., for a period of 5 to 150 minutes, preferably 10 to 100 minutes. It is preferred that the starting epoxyalkylalkoxysilane (I) and aminoalkylalkoxysilane (III) should contain 10 to 40 mole% of an epoxyalkyldialkoxysilane (I) and an aminoalkyldialkoxysilane (III) in total.

The paint B so obtained can be directly mixed with paint A with stirring to form paint A* irrespective of whether or not an organic solvent is used.

The paints A and A* so obtained by the present invention are viscous liquids, and can be directly used as paints without requiring any special solvent for coating. If desired, however, the paints may be diluted with organic solvents such as alcohols, ketones and ethers for use as paints.

Furthermore, the paints A and A* may contain additives such as ultraviolet absorbers, antioxidants, antistatic agents and pigments in amounts which do not deteriorate the properties of the resulting coatings.

The paints can be applied by ordinary methods such as dip coating, spray coating, brush coating, flow coating or roll coating. The final thickness of the coating is usually 3 to 40 microns, preferably 5 to 30 microns. When the final thickness of the coating is smaller than 3 microns, its scratch resistance is substantially low, and if it is larger than 40 microns, cracks tend to form on the coating owing to differences in the coefficient of thermal expansion, etc.

The paint coated on a substrate resin is allowed to stand at room temperature for 5 to 60 minutes, preferably 10 to 30 minutes, and then heat-treated to form a tough coated film. Heating is generally carried out at 100° to 130° C. for 2 to 4 hours. The use of an organic acid or its metal salt, such as p-toluenesulfonic acid, cobalt naphthenate, lead naphthenate or copper naphthenate, as a catalyst can promote the curing reaction and thus make the heat-treatment conditions milder. Hence, the paints of this invention can also be applied to plastics having low thermal stability.

The paints of this invention can be used for various shaped plastic articles. Plastic articles coated with the paints of this invention have very good scratch resistance and permanent antistatic properties. The adhesion of the coated film to a base resin is good, and the paint A* has an especially good adhesion. The paints also have good durability, and exhibit good performance even in outdoor use. Thus, the paints of this invention open up a wider range of applications for plastic articles, and are commercially of great significance.

The following Examples and Comparative Examples illustrate the present invention more specifically.

The properties of the coatings in these examples were determined by the following methods.

1. Appearance after curing

The appearance of the coating is examined by the naked eye after heat curing.

2. Adhesion

Eleven parallel cuts are provided lengthwise and crosswise at intervals of 1 mm on the coated surface to form 100 squares. An adhesive cellophane tape is applied to the cut surface intimately, and a peeling force is exerted abruptly at right angles to the adhering surface. The adhesion is expressed by the number of squares which remain unpeeled at this time.

3. Scratch resistance

A #0000 steel wool is pressed lightly against the coated surface and moved through 15 reciprocations. The degree of scratch on the coated surface is evaluated on the scale of four ranks as follows:

A': no scratch is caused
A: 10 or less scratches are caused

B: more than 10 scratches are caused, but the coated surface still retains luster
C: numerous scratches are caused, and the coated surface loses luster The polycarbonate substrate is rated as C in this test.

4. Antistatic properties

The coated surface is triboelectrically charged with a dry cloth, and is made to approach fresh tobacco ashes slowly. The distance between the coated surface and the tobacco ashes which causes the adhesion of the ashes to the coated surface and the state of adhesion are observed, and are made a measure for antistatic properties.

A polycarbonate article as a base permits adhesion of large quantities of ash when this distance is 3 to 4 cm.

5. Resistance to warm water

The sample is immersed in warm water at 80° C. for 2 hours, and a change in appearance (evaluated visually) and the adhesion of the sample (by method 2 described above) are tested. When no change is noted in boty of these tests, the result will be expressed as "no change".

Examples 1 to 8 show the preparation of paint A.

EXAMPLE 1

A 100 cc four-necked flask equipped with a stirrer, a thermometer and a refluxing device was charged at room temperature with 49.5 g (0.21 mole) of γ-glycidoxypropyltrimethoxysilane and 25.5 g (0.11 mole) of 2,2,3,3,4,4,5,5-octafluoropentanol. They were stirred to form a uniform mixture. A 10% by weight dioxane solution of triethylamine was added in an amount corresponding to 1% by weight of the reaction system. With stirring, the temperature was raised to 80° C. The mixture was stirred continuously for about 12 hours while maintaining the temperature at 80° C.

At the end of this period, the viscosity of the reaction mixture was found to rise considerably.

When 1 part of the resulting product was heated at about 130° C. under reduced pressure, only minor amounts of dioxane and methanol were found to distill out.

The resulting paint was coated on the surface of a polycarbonate article, allowed to stand at room temperature for 30 minutes, and heat-treated at 130° C. for 2 hours. The resulting cured ocating having a thickness of 20 microns was tested for appearance, adhesion, scratch resistance, antistatic properties, and hot water resistance. The results were as follows:

Appearance: transparent
Adhesion: 90–95/100
Scratch resistance: A'
Antistatic properties: ashes did not adhere even when the distance was less than 5 mm
Hot water resistance: no change

EXAMPLES 2 to 7 and COMPARATIVE EXAMPLES 1 to 3

The procedure of Example 1 was repeated except that the amount of the 2,2,3,3,4,4,5,5-octafluoropentanol was changed (Examples 2 to 5 and Comparative Examples 1 to 3); or 2,2,3,3-tetrafluoropropanol was used instead of the 2,2,3,3,4,4,5,5-octafluoropentanol (Examples 6 and 7). The thickness of the coating was 20 microns.

The results are shown in Table 1 together with those obtained in Example 1.

Table 1 shows that paint A of this invention has superior appearance, adhesion, scratch resistance, antistatic properties and hot water resistance. It is seen from Comparative Examples 1 to 3 that when the amount of the fluorinated alcohol is 4.5 mole%, the properties of the resulting coating are generally inferior, and when it is 66.7 mole%, the coating does not cure.

Table 1

| Example (Ex.) or Comparative Example (CEx.) | Composition of paint | | Properties of coatings | | | | |
|---|---|---|---|---|---|---|---|
| | γ-Glycidoxypropyltrimethoxy silane [g (mole)] | Fluorinated alcohol [g (mole)] | Appearance after curing | Adhesion | Scratch resistance | Antistatic properties | Hot water resistance |
| Ex. 1 | 49.5 (0.21) | 25.5 (0.11) | Transparent | 90–95/100 | A' | No ash adhesion at a distance of less than 5 mm | No change |
| Ex. 2 | "(")  | 4.6 (0.02) | " | " | " | No ash adhesion at a distance of less than 5 mm | " |
| Ex. 3 | "(")  | 11.6 (0.05) | " | " | " | No ash adhesion at a distance of less than 5 mm | " |
| Ex. 4 | "(")  | 16.2 (0.07) | " | " | " | No ash adhesion at a distance of less than 5 mm | " |
| Ex. 5 | "(")  | 48.7 (0.21) | " | " | " | No ash adhesion at a distance of less than 5 mm | " |
| Ex. 6 | "(")  | 27.7 (0.21) | " | " | " | No ash adhesion at a distance of less than | " |

Table 1-continued

| Example (Ex.) or Comparative Example (CEx.) | Composition of paint | | Properties of coatings | | | | |
|---|---|---|---|---|---|---|---|
| | γ-Glycidoxy-propyltrimethoxy silane [g (mole)] | Fluorinated alcohol [g (mole)] | Appearance after curing | Adhesion | Scratch resistance | Antistatic properties | Hot water resistance |
| Ex. 7 | "(")" | 14.5 (0.11) | " | " | " | 5 mm No ash adhesion at a distance of less than 5 mm | " |
| CEx. 1 | "(")" | 0 (0) | Opalescent | 50/100 (variation existed) | B | Some ash adhesion at a distance of 10 mm | Cracks occurred |
| CEx. 2 | "(")" | 2.3 (0.01) | Somewhat opalescent | 50/100 (variation existed) | A-B | Some ash adhesion at a distance of 10 mm | Some cracks occurred |
| CEx. 3 | "(")" | 97.5 (0.42) | Not completely cured | — | — | — | — |

EXAMPLE 8

The same reactor as in Example 1 was charged with 51.7 g (0.21 mole) of β-(3,4-epoxycyclohexyl)ethyltrimethoxysilane and 22.5 g (0.11 mole) of 2,2,3,3,4,4,5,5-octafluoropentanol, and they were uniformly mixed with stirring. A 70% aqueous solution of perchloric acid was dissolved in dioxane in a concentration of 5% by weight. The solution was added to the reaction system in an amount of 0.35% by weight as perchloric acid. With stirring, the reaction system was heated to 60° C. The mixture was stirred at this temperature for 15 hours to terminate the reaction and form a paint.

At this time, the viscosity of the reaction mixture showed a considerable rise. When a part of this paint was heated at 120° C. under reduced pressure, only some amounts of dioxane and methanol were seen to distill off.

The paint was coated on the surface of a polycarbonate article, allowed to stand at room temperature for 30 minutes, and then heat-treated at 130° C. for 2 hours.

The properties of the resulting cured coating were determined, and the following results were obtained.
Thickness: 15 to 20 microns
Appearance: transparent
Adhesion: 90–95/100
Scratch resistance: A'
Antistatic properties: no ash adhesion at a distance of less than 5 mm
Hot water resistance: no change The following Referential Examples 1 and 2 show the preparation of paint A.

Referential Example 1

A four-necked flask equipped with a refluxing device, a thermometer and a stirrer was charged with 90 g of dehydrated isobutyl alcohol, and then 2.3 g (0.012 mole) of N-β-aminoethylaminomethyltrimethoxysilane, 7.4 g (0.036 mole) of N-(dimethoxymethylsilylpropyl)-ethylenediamine and 11.4 g (0.048 mole) of γ-glycidoxypropyltrimethoxysilane were added. The mixture was stirred at 90° C. for 2 hours. When the infrared absorption spectrum of the contents of the flask was determined at this stage, it was found that the absorption band ascribable to the epoxy group disappeared. The reaction mixture was cooled to room temperature, and 1 g (22% based on the total amount of methoxy groups hydrolyzed) of water was added. The mixture was again heated to 50° C., and stirred for 90 minutes to hydrolyze the reaction product partially. Thus, a solution of paint B (19% as solids content) was obtained.

REFERENTIAL EXAMPLE 2

A four-necked reactor was charged with 2.5 g (0.011 mole) of N-(trimethoxysilylpropyl)-ethylenediamine and 7.0 g (0.034 mole) of N-(dimethoxymethylsilylpropyl)-ethylenediamine, and with stirring, the mixture was heated to 100° C. Then, at this temperature, 20.6 g (0.086 mole) of γ-glycidoxypropyltrimethoxysilane was added dropwise with stirring. The mixture was further stirred for 30 minutes to form a paint B. When the infrared absorption spectrum of the reaction product was measured at this stage, it was found that the absorption band ascribable to the epoxy group disappeared.

The following Examples show the preparation of paint A*.

EXAMPLES 9 to 13 and COMPARATIVE EXAMPLES 4 to 7

Paint A obtained in Example 1 and a solution of paint B obtained in Referential Example 1 were mixed in accordance with the formulations shown in Table 2. The mixture was coated, cured and tested in the same way as in Example 1. The thickness of the coating was 10 to 15 microns. The results are shown in Table 2 together with those obtained in Example 1.

Table 2 shows that the paint A* of the invention has improved adhesion over paint A, and its other properties are as good as those of paint A. It is seen from Comparative Examples 4 to 7 that when the proportion of paint B was 60% by weight or more, the durability and antistatic properties of the resulting coatings were somewhat inferior.

Table 2

| Example (Ex.) or Comparative Example (CEx.) | Paint A* Paint A (wt. %) | Paint B (solids content) (wt. %) | Appearance after curing | Adhesion | Scratch resistance | Antistatic properties | Hot water resistance |
|---|---|---|---|---|---|---|---|
| Ex. 1 | 100 | 0 | Transparent | 90–95/100 | A' | No ash adhesion at a distance of less than 5 mm | No change |
| Ex. 9 | 90 | 10 | " | 100/100 | " | No ash adhesion at a distance of less than 5 mm | " |
| Ex. 10 | 80 | 20 | " | " | " | No ash adhesion at a distance of less than 5 mm | ". |
| Ex. 11 | 70 | 30 | " | " | " | No ash adhesion at a distance of less than 5 mm | " |
| Ex. 12 | 60 | 40 | " | " | " | No ash adhesion at a distance of less than 5 mm | " |
| Ex. 13 | 50 | 50 | " | " | " | No ash adhesion at a distance of less than 5 mm | " |
| CEx. 4 | 40 | 60 | " | " | " | No ash adhesion at a distance of less than 5 mm | Some cracks occurred |
| CEx. 5 | 30 | 70 | " | " | " | Some ash adhesion at a distance of 10 mm | Cracks occurred |
| CEx. 6 | 20 | 80 | " | " | " | Some ash adhesion at a distance of 10 mm | Cracks occurred |
| CEx. 7 | 0 | 100 | " | " | " | Considerable ash adhesion at a distance of 20 mm | Cracks occurred on the entire surface |

EXAMPLES 14 to 21 and COMPARATIVE EXAMPLES 8 to 11

Paints (Examples 14 to 17 and Comparative Examples 8 to 11) obtained by mixing paint A obtained in Example 1 with paint B obtained in Referential Example 2 in varying mixing ratios, and paints (Examples 18 to 19) obtained by diluting some of them with a solvent, and paints (Examples 20 and 21) obtained by mixing the paint A obtained in Example 5 with the paint B obtained in Referential Example 1 at varying mixing ratios were each coated, cured, and tested in the same way as in Example 1. The results are shown in Table 3.

Table 3 shows that the paint A* of this invention is very good. It is seen from Comparative Examples 8 to 11 that when the proportion of paint B is 60% by weight or more, the resulting coating have infeior scratch resistance, antistatic properties and hot water resistance.

Table 3

| Ex. or CEx. | Composition of paint Paint A Type | wt. % | Paint B Type | wt. % | Solvent (β-hydroxyethyl-ether wt. % | Thickness (μ) | Appearance after curing | Adhesion | Scratch resistance | Antistatic properties | Hot water resistance |
|---|---|---|---|---|---|---|---|---|---|---|---|
| Ex. 14 | Ex. 1 | 90 | REx. 2 | 10 | — | 10 | Transparent | 100/100 | A' | No ash adhesion at a distance of less than 5 mm | No change |
| Ex. 15 | " | 80 | " | 20 | — | " | Trans- | " | " | No ash adhesion | " |

Table 3-continued

| Ex. or CEx. | Composition of paint | | | | Solvent (β-hydroxyethyl-ether) wt. % | Thickness (μ) | Properties of coatings | | | | |
|---|---|---|---|---|---|---|---|---|---|---|---|
| | Paint A | | Paint B | | | | Appearance after curing | Adhesion | Scratch resistance | Antistatic properties | Hot water resistance |
| | Type | wt. % | Type | wt. % | | | | | | | |
| | | | | | | | parent | | | at a distance of less than 5 mm | |
| Ex. 16 | " | 60 | " | 40 | — | " | Transparent | " | " | No ash adhesion at a distance of less than 5 mm | " |
| Ex. 17 | " | 50 | " | 50 | — | " | Transparent | " | " | No ash adhesion at a distance of less than 5 mm | " |
| Ex. 18 | " | 45 | " | 5 | 50 | 6 | Transparent | " | " | No ash adhesion at a distance of less than 5 mm | " |
| Ex. 19 | " | 25 | " | 25 | 50 | " | Transparent | " | " | No ash adhesion at a distance of less than 5 mm | " |
| Ex. 20 | Ex. 5 | 80 | REx. 1 | 20 | — | 7 | Transparent | " | " | No ash adhesion at a distance of less than 5 mm | " |
| Ex. 21 | " | 70 | " | 30 | — | " | Transparent | " | " | No ash adhesion at a distance of less than 5 mm | " |
| CEx. 8 | Ex. 1 | 0 | REx. 2 | 100 | — | 10 | Transparent | " | A | Considerable ash adhesion at a distance of 20 mm | Cracks occurred on the entire surface |
| CEx. 9 | " | 20 | " | 80 | — | " | Transparent | " | " | Some ash adhesion at a distance of 10 mm | Cracks occurred |
| CEx. 10 | " | 30 | " | 70 | — | " | Transparent | " | " | Some ash adhesion at a distance of 10 mm | Cracks occurred |
| CEx. 11 | " | 40 | " | 60 | — | " | Transparent | " | " | No ash adhesion at a distance of less than 5 mm | Some cracks occurred |

Ex. = Example;
CEx. = Comparative Example;
REx. = Referential Example

EXAMPLE 22

90% by weight of the paint A obtained in Example 8 was mixed with 10% by weight, as solids content, of the paint B obtained in Referential Example 1 at room temperature for 30 minutes with stirring. The resulting paint was coated, heat-treated, and tested in the same way as in Example 1. The results were as follows:
Thickness: 5 to 7μ
Appearance: transparent
Adhesion: 100/100
Scratch resistance: A'
Antistatic properties: no ash adhesion at a distance of less than 5 mm
Hot water resistance: no change

EXAMPLE 23

To the paint A* obtained in Example 14 was added 0.5% by weight of p-toluenesulfonic acid. The mixture was coated on a shaped article of polymethyl methacrylate, allowed to stand for 30 minutes at room temperature, and then heat-treated at 100° C. for 4 hours. The resulting coating had a thickness of about 10μ, and was found to have the following properties.
Appearance: transparent
Adhesion: 100/100
Scratch resistance: A'
Antistatic properties: no ash adhesion at a distance of less than 5 mm
Hot water resistance: no change

EXAMPLE 24

The paint used in Example 23 was coated on a shaped article of polystyrene, allowed to stand at room temperature for 30 minutes, and then heat-treated at 70° C. for 4 hours. The resulting coating had a thickness of about 10μ, and was found to have the following properties.
Appearance after curing: transparent
Adhesion: 100/100
Scratch resistance: A'
Antistatic properties: no ash adhesion at a distance of less than 5 mm
Hot water resistance: no change

What we claim is:
1. A surface-treating paint for shaped plastic articles, said paint being the reaction product of
(1) 50 to 95 mole % of an epoxyalkylalkoxysilane of the general formula

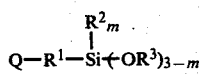

wherein $R^1$ represents a divalent hydrocarbon group having 1 to 4 carbon atoms, $R^2$ and $R^3$ represent a monovalent hydrocarbon group having 1 to 4 carbon atoms, Q represents a glycidoxy or epoxycyclohexyl group, and m is 0 or 1, and (2) 50 to 5 mole % of a fluorinated alcohol of the general formula

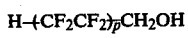

wherein p represents an integer of 1 to 7, at a reaction temperature of 60° to 120° C. for 5 to 20 hours.

2. A surface-treating paint for shaped plastic articles, said paint being a mixture of
(A) 50 to 95% by weight of a paint which is the reaction product of (1) 50 to 95 mole % of an epoxyalkylalkoxysilane of the general formula

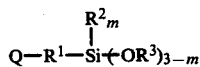

wherein $R^1$ represents a divalent hydrocarbon group having 1 to 4 carbon atoms, $R^2$ and $R^3$ represent a monovalent hydrocarbon group having 1 to 4 carbon atoms, Q represents a glycidoxy or epoxycyclohexyl group, and m is 0 or 1, and (2) 50 to 5 mole % of a fluorinated alcohol of the general formula

wherein p is an integer of 1 to 7, and
(B) 50 to 5% by weight of the reaction product of (3) 80 to 30 mole % of an epoxyalkylalkoxysilane of general formula (I) with (4) 20 to 70 mole % of an aminoalkylalkoxysilane of the general formula

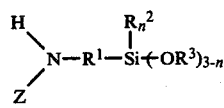

wherein $R^1$, $R^2$ and $R^3$ are as defined with regard to general formula (I), Z represents a hydrogen atom or an aminoalkyl group, and n is 0 or 1, or a partially hydrolyzed product of the reaction product, reaction product (A) being obtained by reaction at a temperature of 60° to 120° C. for 5 to 20 hours, and reaction product (B) being obtained by reaction at a temperature of 60° to 150° C. for 0.3 to 3 hours.

3. The surface-treating paint of claim 2 wherein the partially hydrolyzed product as component (B) results from the hydrolysis of not more than 40 mole% of all alkoxy groups of the epoxyalkylalkoxysilane and the aminoalkylalkoxysilane.

4. The surface-treating paint of claim 2 wherein 10 to 40 mole% of the sum of the epoxyalkylalkoxysilane and the aminoalkylalkoxysilane as starting compounds for production of the reaction product as component (B) consists of dialkoxysilanes.

5. The surface-treating paint of claim 1 wherein the reaction product of (1) and (2) is prepared by reaction at a temperature of 70° to 100° C. for 10 to 15 hours.

6. The surface treating paint of claim 2 wherein the reaction product (A) is obtained by reaction at a temperature of 70° to 100° C. for 10 to 15 hours and the reaction product (B) is obtained by reaction at a temperature of 80° to 120° C. for 1 to 2 hours.

* * * * *